Nov. 17, 1959 W. W. YARRISON ET AL 2,912,717
MOLD STRUCTURES AND MOLD CONVEYING MEANS
Filed Dec. 21, 1955 13 Sheets-Sheet 1
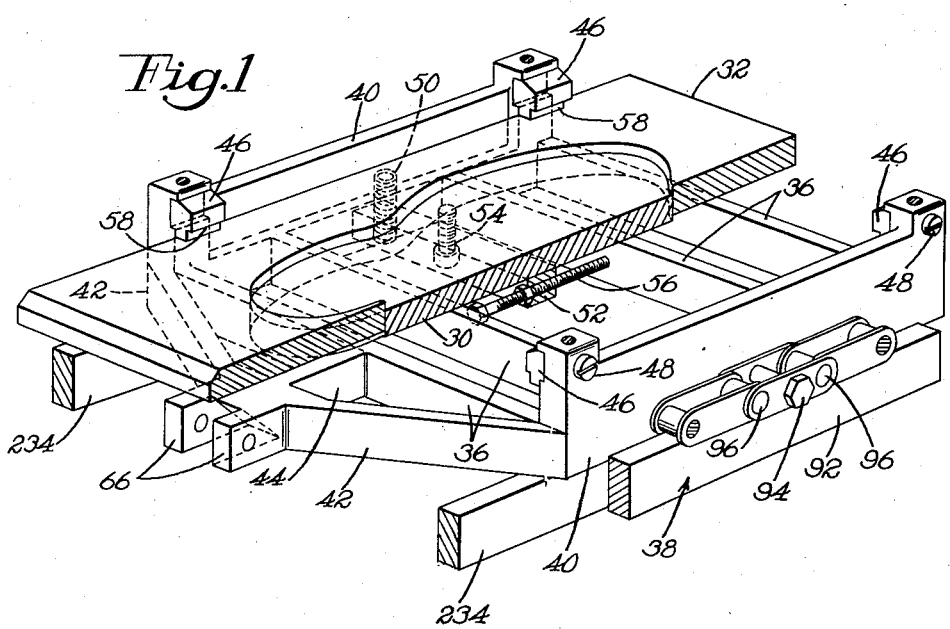
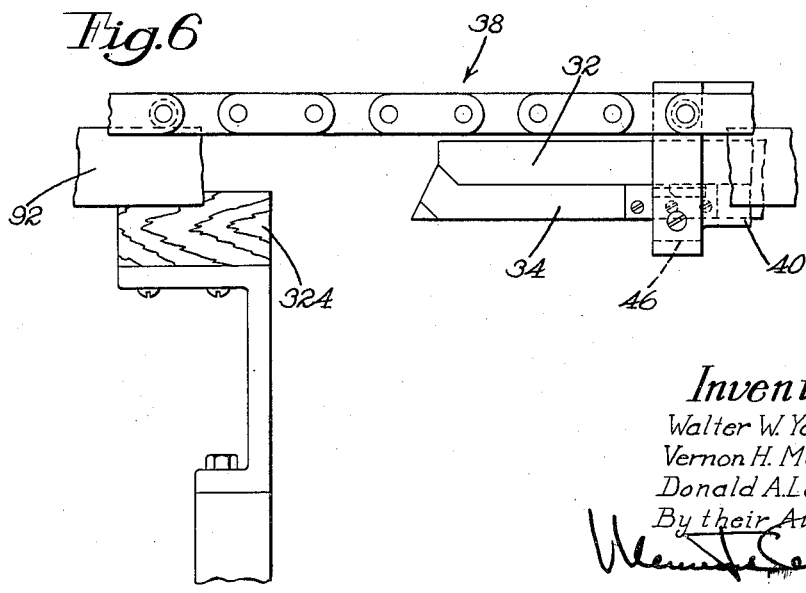
Inventors
Walter W. Yarrison
Vernon H. Meyer
Donald A. Lane
By their Attorney

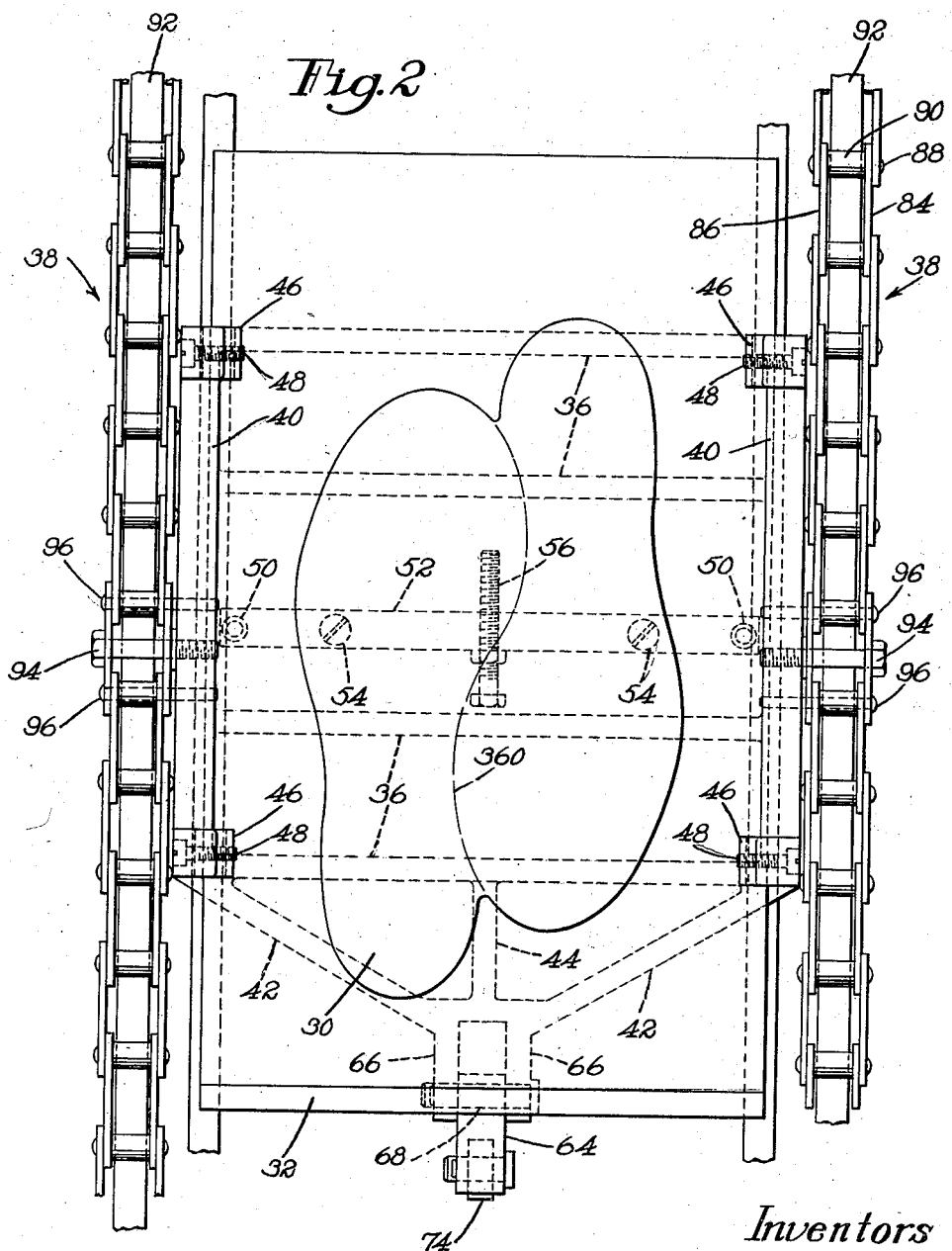

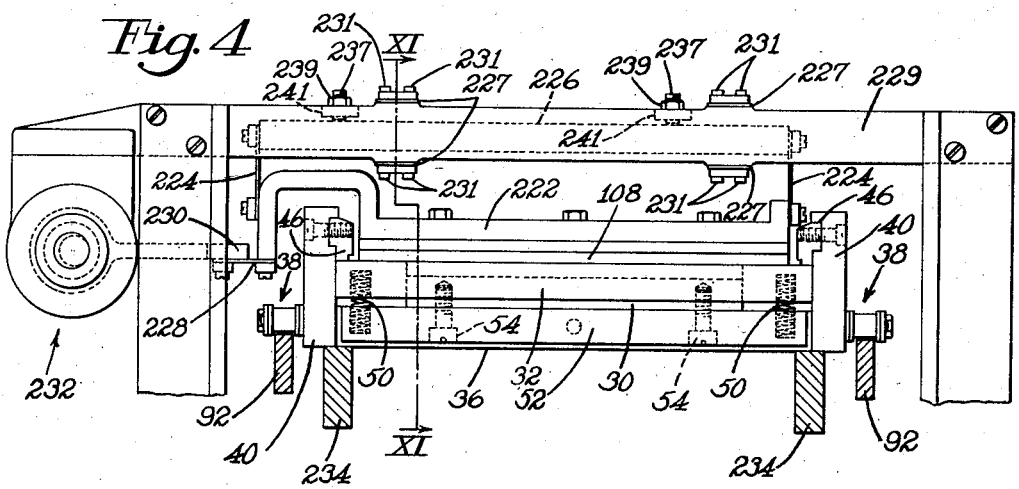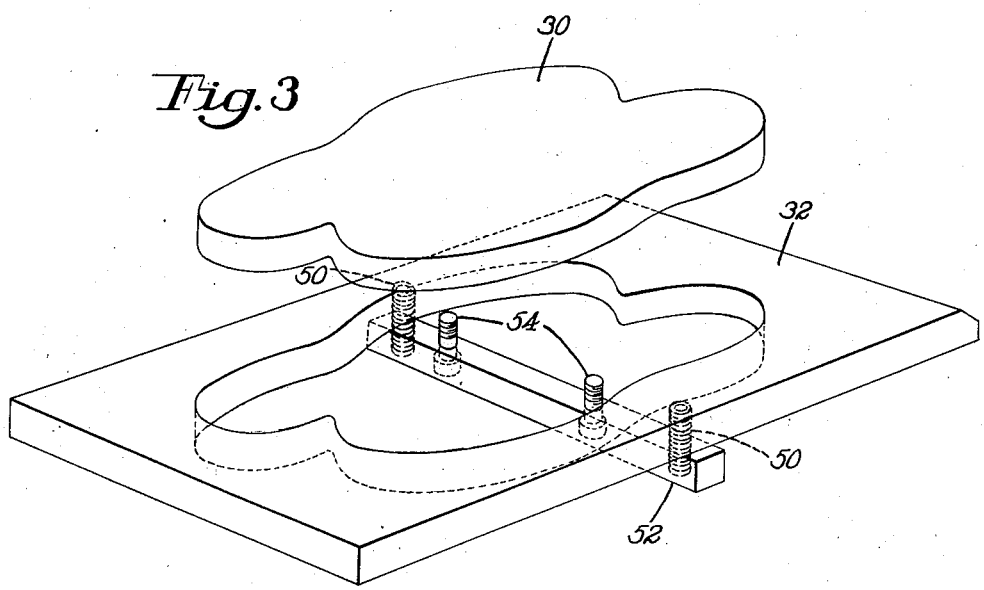

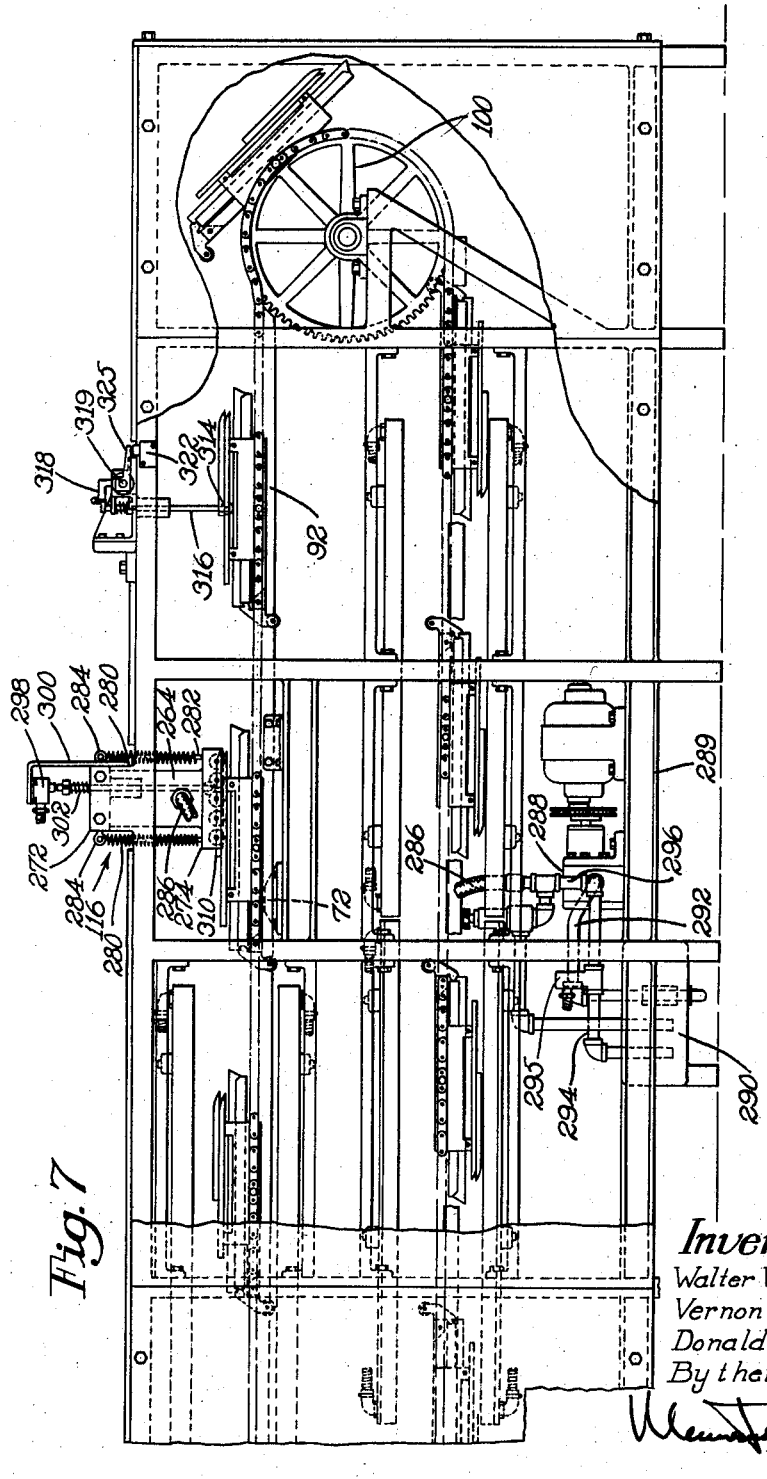

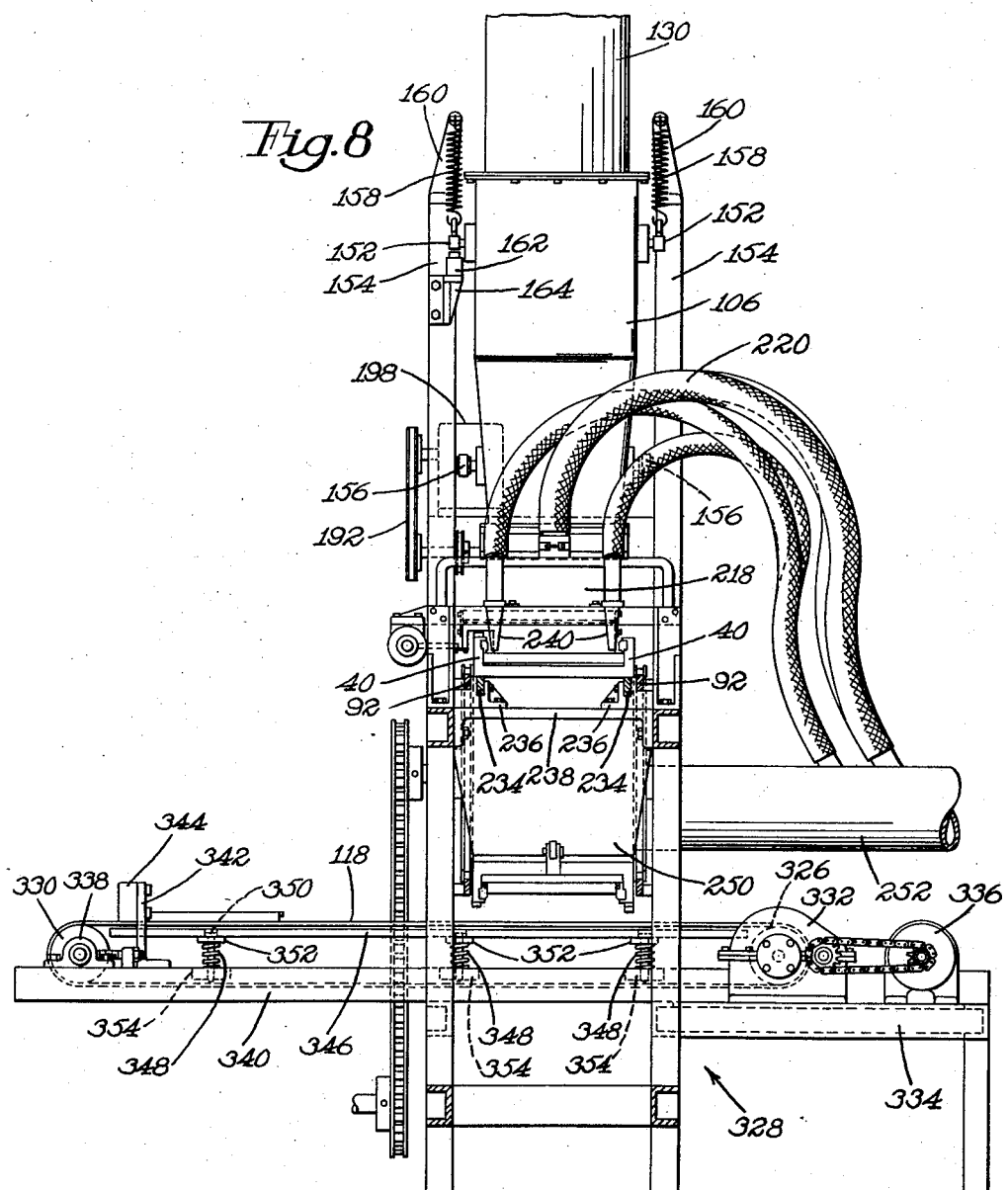

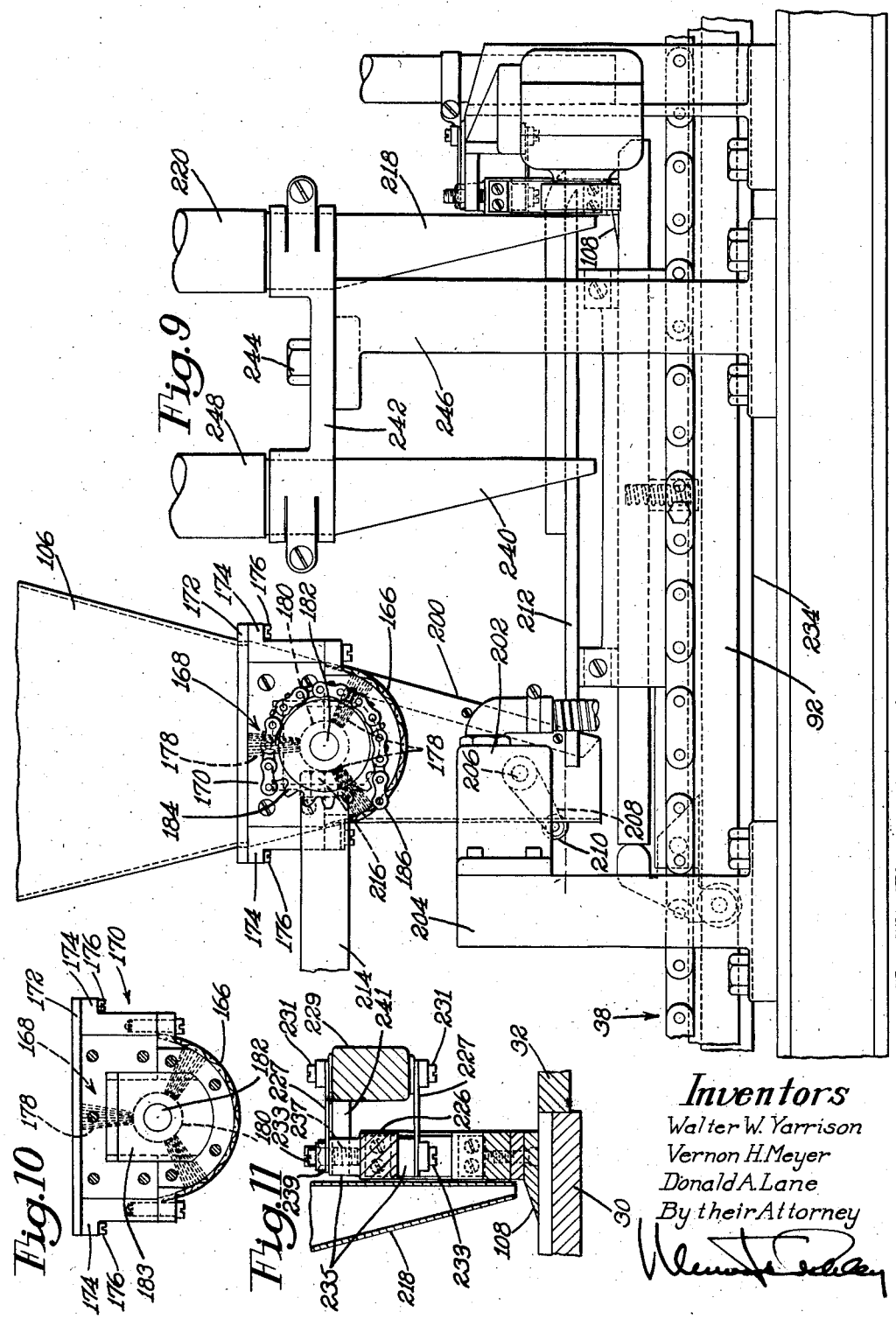

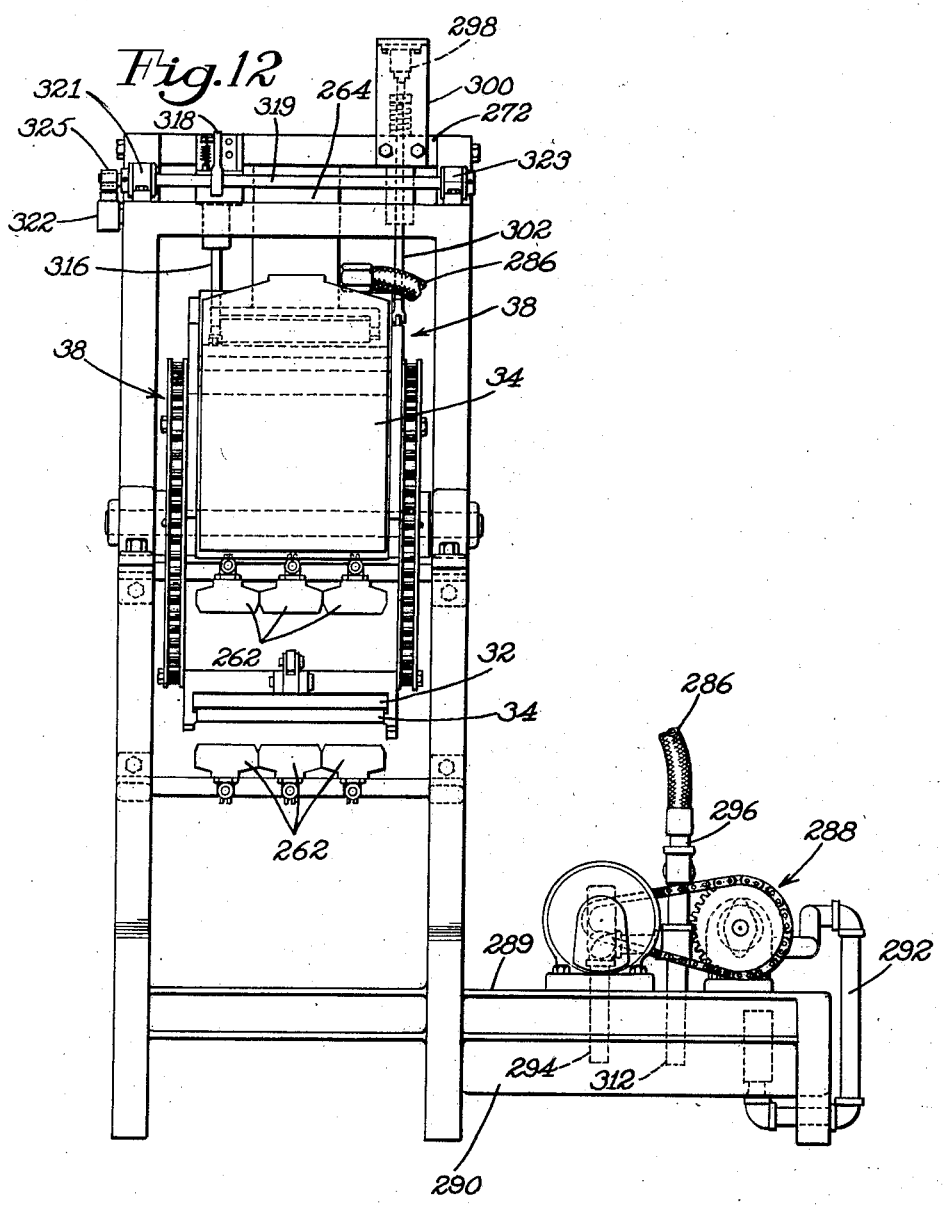

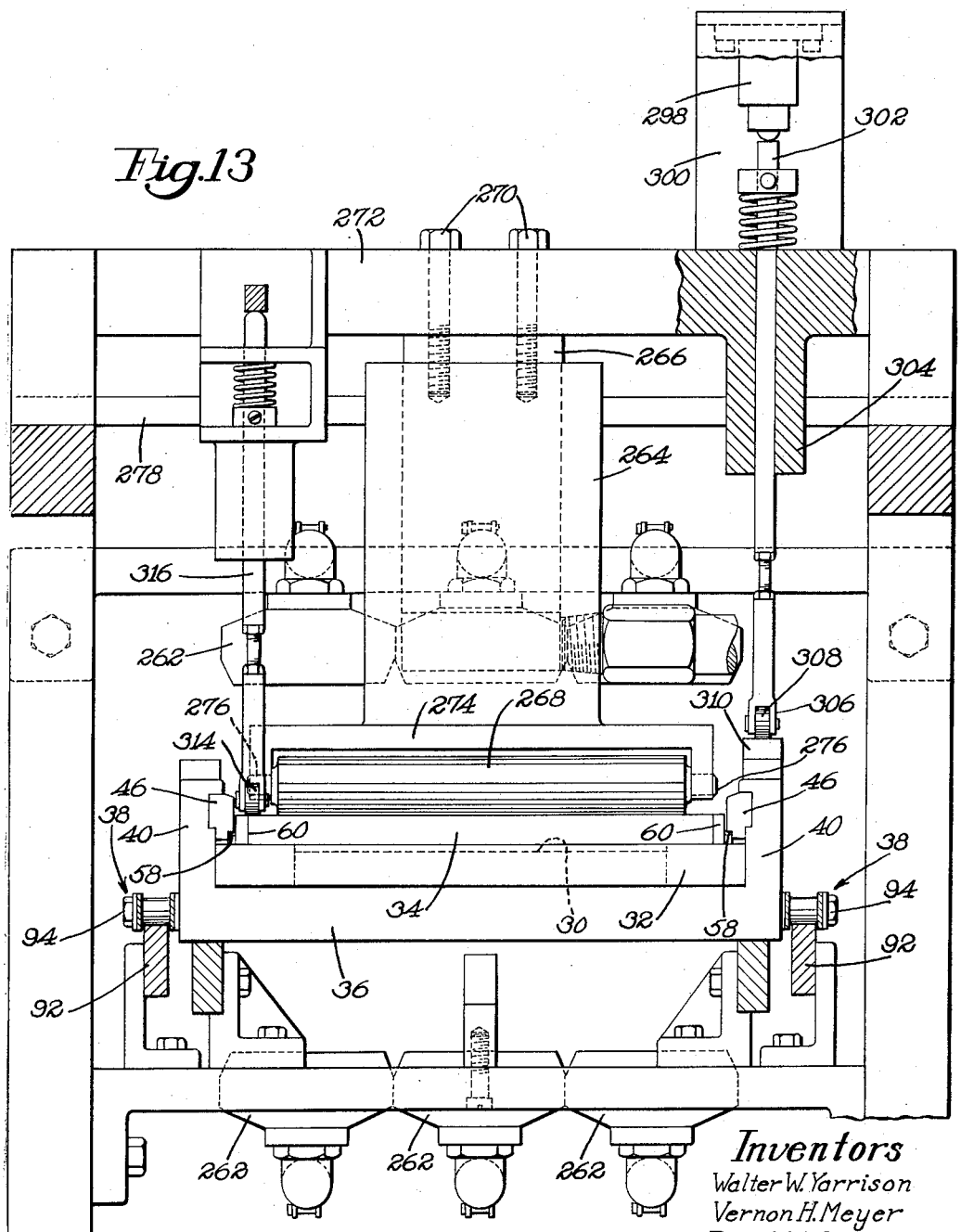

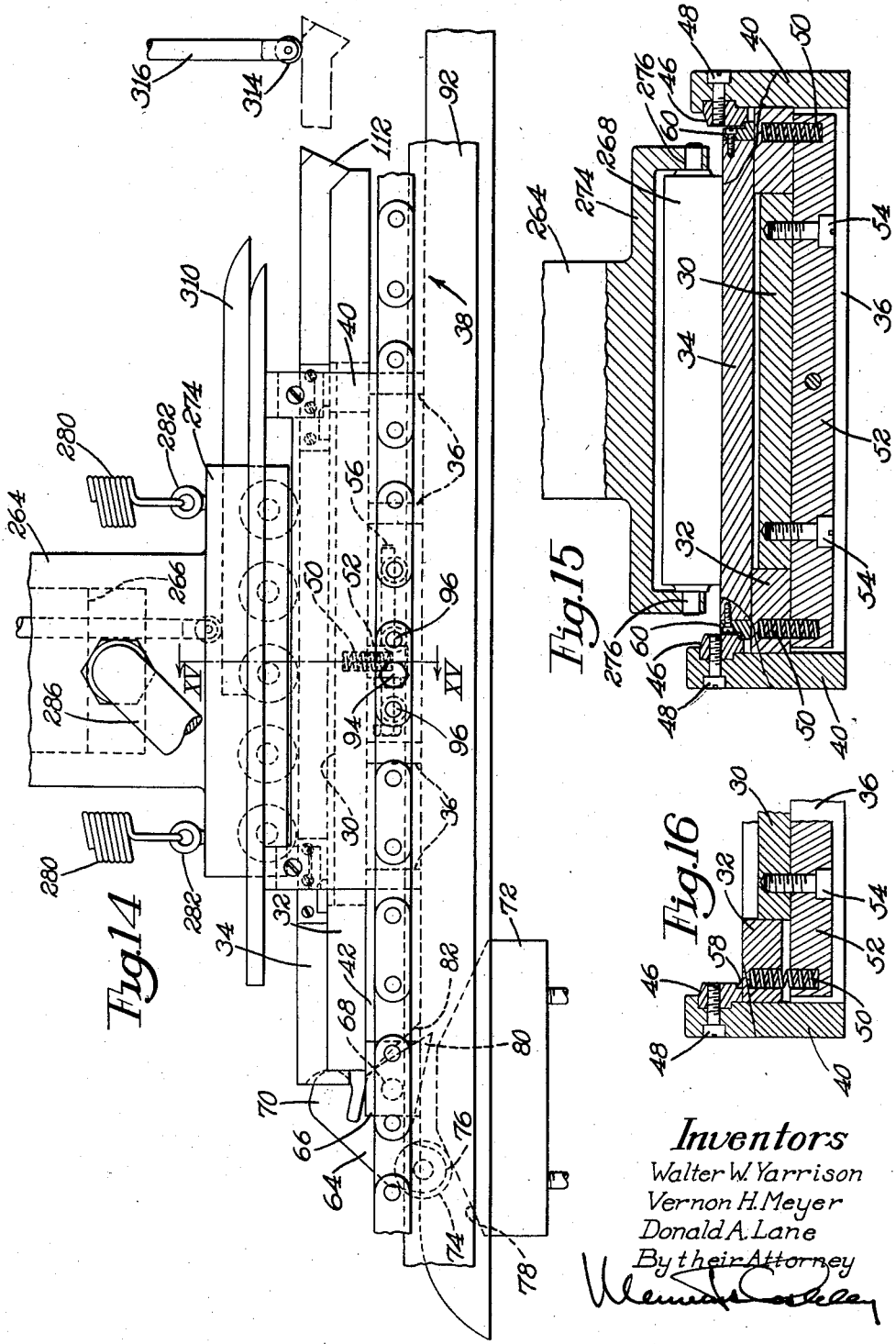

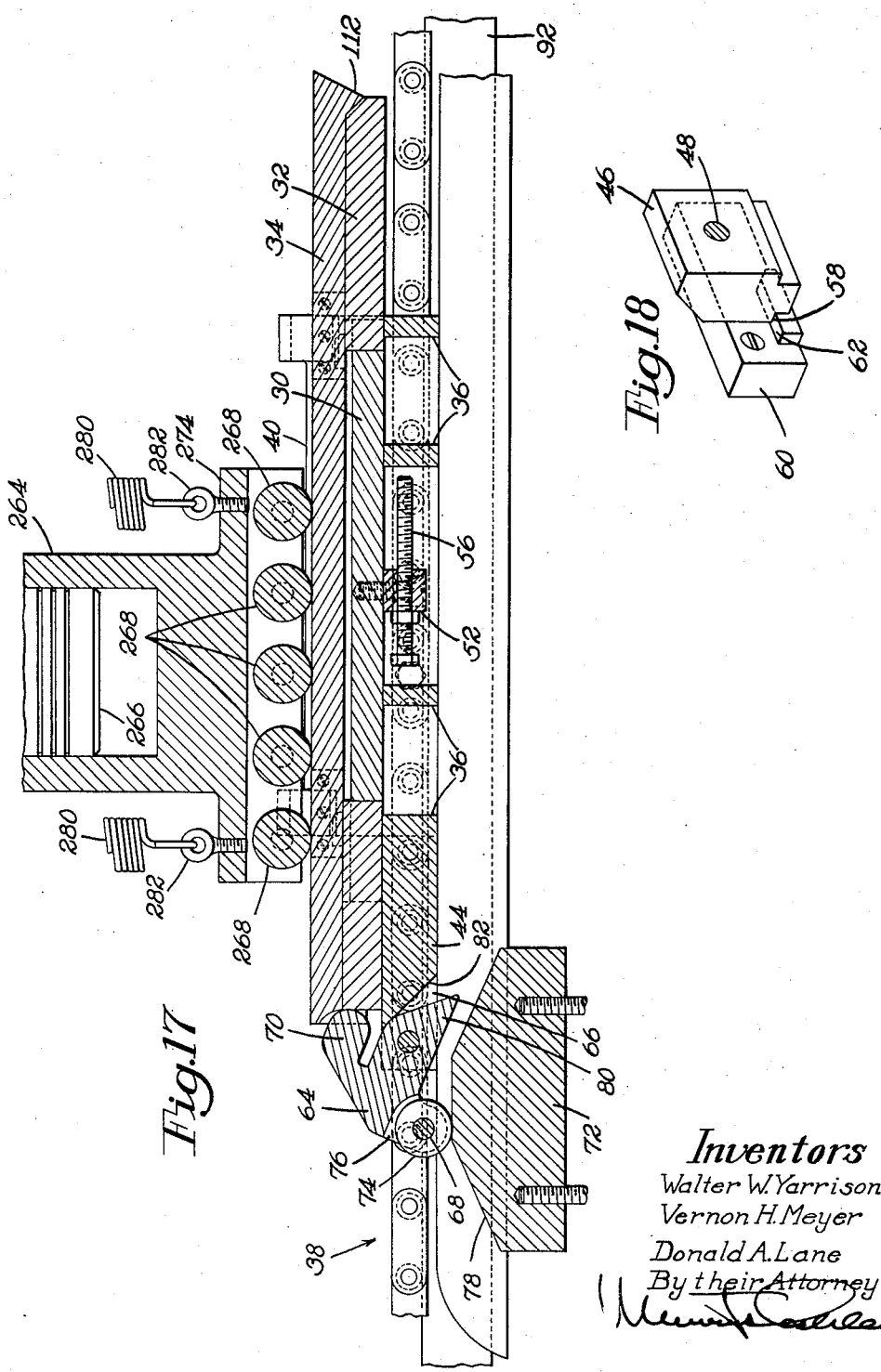

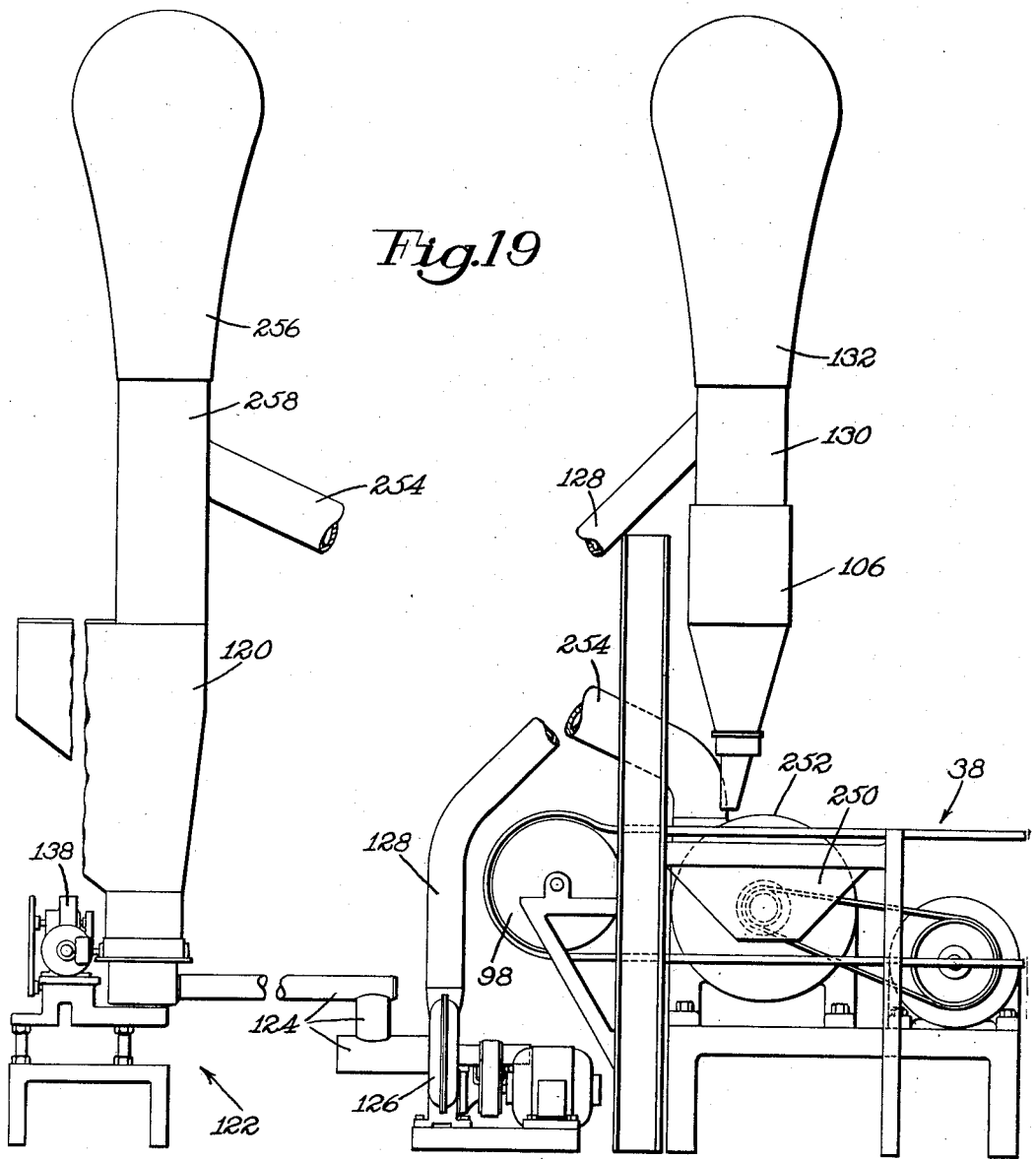

Nov. 17, 1959   W. W. YARRISON ET AL   2,912,717
MOLD STRUCTURES AND MOLD CONVEYING MEANS
Filed Dec. 21, 1955   13 Sheets-Sheet 13
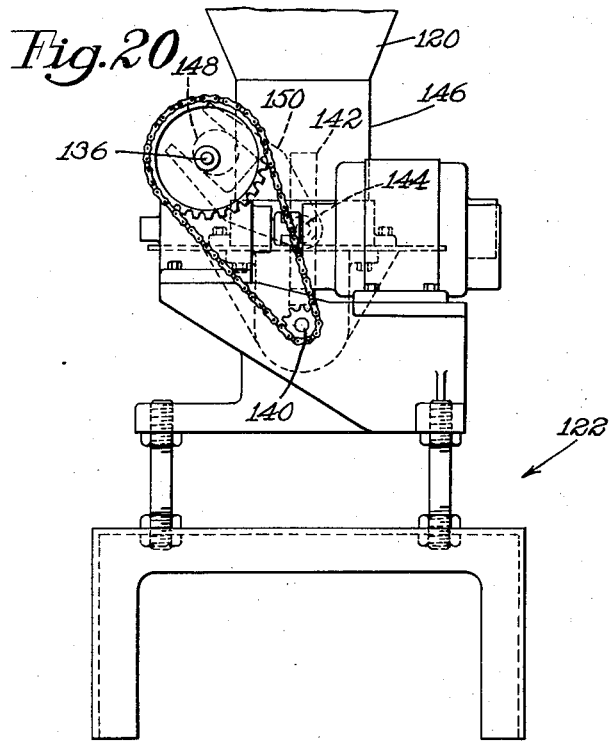
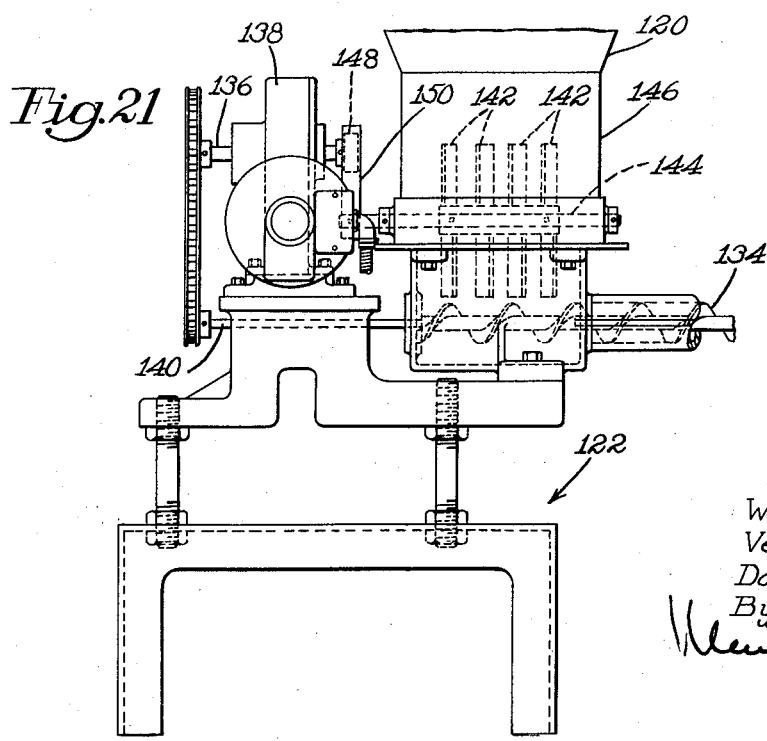
Inventors
Walter W. Yarrison
Vernon H. Meyer
Donald A. Lane
By their Attorney

United States Patent Office 2,912,717
Patented Nov. 17, 1959

2,912,717

MOLD STRUCTURES AND MOLD CONVEYING MEANS

Walter W. Yarrison and Vernon H. Meyer, Beverly, and Donald A. Lane, Lynn, Mass., assignors to United Shoe Machinery Corporation, Flemington, N.J., a corporation of New Jersey Application December 21, 1955, Serial No. 554,498

3 Claims. (Cl. 18—4)

This invention relates to mold structures and mold conveying organizations, and is herein illustrated in its application to assemblies of such structures and organizations adapted for use in the production of molded sheets from thermoplastic granular material by heat and pressure.

It is an object of the present invention to provide an organization whereby a mold is automatically charged and conveyed through a heat applying station and a pressure applying station and automatically discharged after the completion of the molding operation.

With the above and other objects in view, as will hereinafter appear, the present invention comprises the combination of a carriage and a three-piece mold mounted in the carriage and pressure means for effecting relative movement of the mold elements thereby to determine a minimum depth of the mold cavity and to cause the compression of a charge therein. The mold elements comprise a base, a ring, and a cover. The pressure applied to the charge in the mold cavity is retained by means rendered operative by movement of the mold elements lengthwise of the carriage by an actuator which is operated by means rendered effective by movement of translation of the mold carriage. The depth of the mold cavity at the charging station is determined by means on the carriage for positioning the ring relatively to the base, and the depth of the mold cavity after the application of pressure to the mold elements at the pressure station is determined by means on the carriage which acts on the cover to position the cover and the ring relatively to the base depthwise of the mold. The last-mentioned positioning means determines the degree of compaction of the charge in the mold cavity during the final stage of the curing cycle. In the illustrated organization a suitable conveyor is provided for effecting movement of translation of the mold carriage.

These and other features of the invention will now be described with reference to the accompanying drawings and pointed out in the appended claims.

In the drawings,

Fig. 1 is a perspective view illustrating a three part mold and its carriage incorporating features of the present invention;

Fig. 2 is a plan view showing the mold with its cover removed and showing the mold carriage together with portions of a chain link conveyor on which the carriage is mounted;

Fig. 3 is an exploded perspective view illustrating the ring and the base of the mold;

Fig. 4 is an end elevation of the mold and its carriage shown in combination with a doctor blade assembly;

Fig. 6 is a detail view illustrating particularly means for disengaging the mold cover from the carriage;

Fig. 7 is a front elevation of the right end portion of the assembly comprising the conveyor, a plurality of mold assemblies mounted thereon, an oven through which the mold assemblies are carried by the conveyor and other associated parts;

Fig. 8 is an end elevation illustrating features of the assembly shown in Fig. 5;

Fig. 9 is an enlarged view in front elevation illustrating a portion of the assembly shown in Fig. 5;

Fig. 10 is a detail view illustrating particularly a rotary brush assembly mounted in the lower portion of the charging hopper;

Fig. 11 is a sectional view taken substantially on the line XI—XI of Fig. 4;

Fig. 12 is a right end elevation of the assembly illustrated in Fig. 7;

Fig. 13 is an enlarged view in end elevation illustrating particularly the pressure applying mechanism shown in Fig. 12;

Fig. 14 is an enlarged view in front elevation illustrating portions of the assembly shown in Fig. 7 and particularly the means for advancing the mold assembly into a position in which it is locked to the carriage;

Fig. 15 is a section taken substantially on the line XV—XV of Fig. 14;

Fig. 16 is a sectional view taken on the same plan as Fig. 15 illustrating the arrangement of the mold base, the mold ring and the carriage before the mold cover is placed on the ring;

Fig. 17 is a sectional elevation taken on a plan common to the longitudinal axis of the mold and illustrating particularly the pressure applying means and the locking mechanism;

Fig. 18 is an enlarged perspective view illustrating parts of the locking mechanism;

Fig. 19 is a front elevation illustrating particularly the supply hopper, the charging hopper and the powder transmission mechanisms, certain parts of the transmission mechanism and the supply hopper being broken away for convenience of illustration;

Fig. 20 is an end elevation illustrating particularly the powder handling mechanisms in the base of the supply hopper; and Fig. 21 is a front elevation of the mechanism illustrated in Fig. 20.

Figure 5:
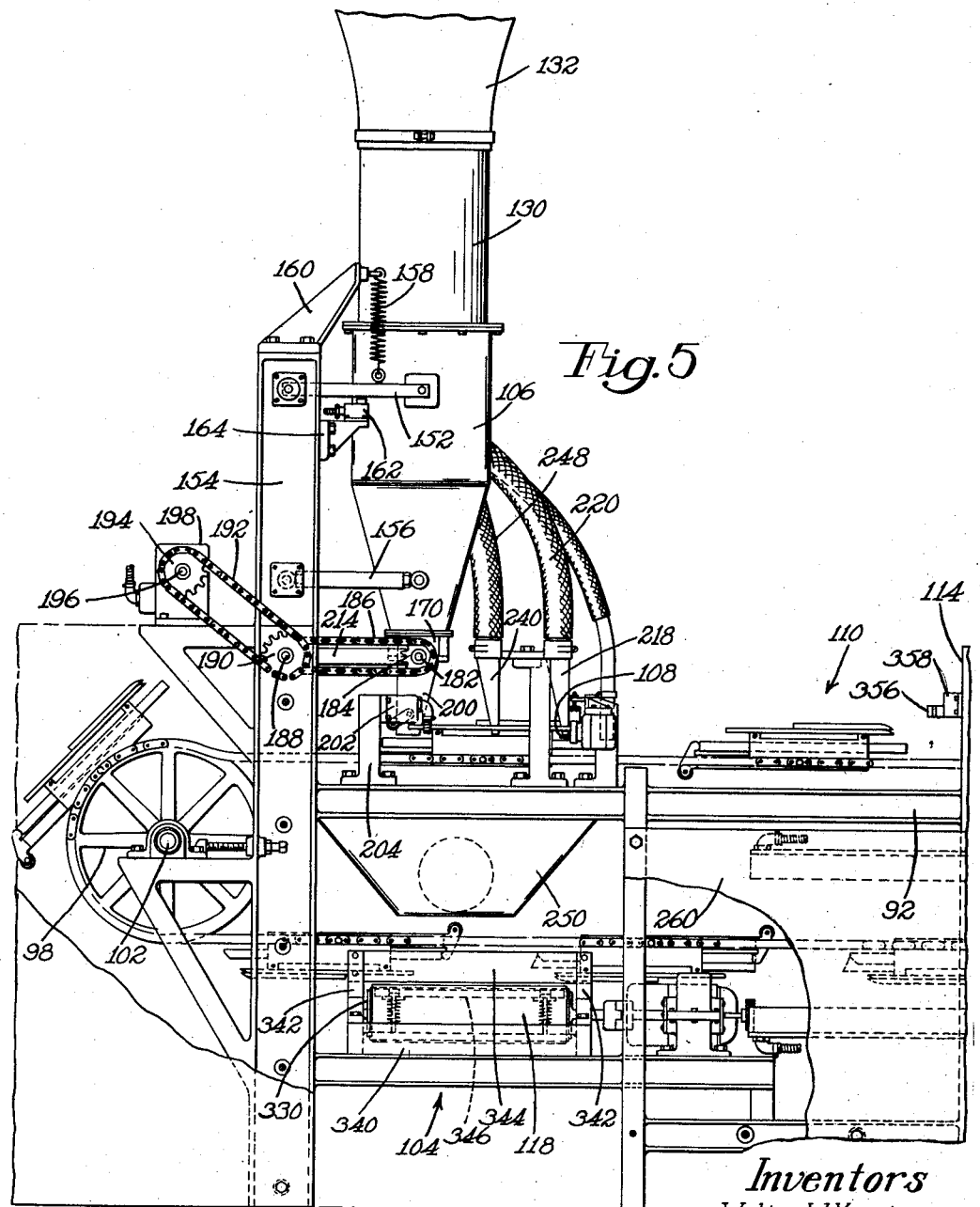
Fig. 5 is a front elevation illustrating the left end portion of the assembly comprising the conveyor, the molds and the mold charging mechanism.

Referring to Figs. 1 and 2, the illustrated mold assembly comprises a base 30 having the shape of a pair of insoles reversed endwise relatively to each other and joined together along the complementally shaped portions of their inside edge faces, a rectangular member or ring 32 having its central portion cut out to provide the continuous wall of a mold cavity having the same shape as the mold base 30, and a cover 34 which rests on the ring 32. In order to insure that the preform produced in the illustrated mold will be discharged from the mold by gravity alone the surfaces which form the mold cavity are permanently treated with an adhesion repellent resinous material such, for example, as polytetrafluoroethylene. Both the base plate 30 and the ring 32 are supported on parallel crossbars 36 of a mold carriage which is mounted on a conveyor assembly comprising two chains 38 (Fig. 2) arranged at opposite sides of the carriage. As shown in Fig. 1, the crossbars 36 of the carriage are parts of a casting which includes parallel side members 40 and angular end struts 42 which, together with a longitudinal central strut 44, provide means for bracing the carriage structure. The ring 32 is positioned widthwise thereof relatively to the mold carriage by the engagement of its side edge faces with the inner surfaces of the opposite sides 40 of the carriage which are extended upwardly from the crossbars 36, as shown in Fig. 1. The mold base 30 is positioned horizontally relatively to the ring 32 by its engagement with the wall of the opening in the ring and is positioned vertically by the crossbars 36 on which it is supported, the base and the ring being constructed and arranged for freedom of movement relatively to each other vertically or depthwise of the mold. The ring 32 in its normal or rest position is positioned vertically or depthwise of the mold by its engagement with four locking members or gibs 46 secured to upward extensions of the side members 40, two at each side of the carriage. The gibs 46 are mounted in suitable recesses in the side members 40 and are secured thereto by headed screws 48. The ring is held against the flat bottom surfaces of the gibs 46 by two springs 50 (Fig. 3) the upper portions of which are mounted in suitable sockets formed at opposite sides of the ring and midway between its ends and the lower portions of which are mounted in sockets in the opposite end portions of a crossbar 52 secured by headed screws 54 to the bottom of the mold base 30. It will be understood that the position of the ring 32 determined by the gibs 46 defines the initial depth of the mold cavity. To provide for the locking of the mold cover 34 to the carriage the base portion of each gib 46 is rabbeted to provide an exposed shoulder 58 (Fig. 18) and the cover has secured to its opposite side edge faces four locking elements herein illustrated as blocks 60 each of which is rabbeted to provide a shoulder 62 which engages the shoulder 58 during the movement of the mold assembly relatively to the carriage thereby locking the mold cover against movement vertically or depthwise of the mold relatively to the carriage.

During the transfer of the mold from the upper section of the oven to the lower section thereof the mold assembly and the carriage, moving as a unit, assume first an inclined position, as shown in Fig. 7, and then a vertical position in which the force of gravity, if unrestrained, would cause the mold assembly to slide from the carriage and fall to the bottom of the oven. In order to prevent such downward movement of the mold assembly relatively to the carriage and to maintain the locking relation between the blocks 60 and the gibs 46 an abutment screw 56 (Fig. 17) is mounted in the crossbar 52 and arranged to engage one of the crossbars 36. The abutment screw is shorter than the distance between the adjacent crossbars 36 by an increment sufficient to permit the movement of the mold assembly between its locked position and its unlocked position.

Just prior to the locking movement of the mold assembly the mold cover 34 and the ring 32 are moved downwardly relatively to the mold base 30 into their position illustrated in Fig. 15 by a depressor mechanism hereinafter described, thus reducing the depth of the mold cavity and compacting the charge therein. The depression of the mold cover and the ring compresses the springs 50 and the expansive force of the springs operates after the retraction of the depressor mechanism to press the blocks 60 against the gibs 46 with sufficient force to prevent free movement of the mold assembly relatively to the carriage. For moving the mold assembly relatively to the mold carriage to advance the cover into its locked position the rear portion of the carriage is provided with an actuator herein illustrated as a lever 64. As illustrated in Fig. 2, the lever 64 is positioned between two parallel ears 66 projecting rearwardly from the angular struts 42 and carrying a pivot pin 68 on which the lever is fulcrumed. As shown in Fig. 17, the lever 64 is swung in a clockwise direction to cause a rounded and forwardly offset head 70 to engage simultaneously the rear surfaces of the cover 34 and the ring 32 thereby to advance the mold assembly in order to bring the cover into its locked position. To provide for the operation of the lever 64 a fixed cam member 72 is so arranged that during the advancement of the carriage a roll 74 pivotally mounted between downwardly extending ears 76 of the lever 64 engages an upwardly inclined cam surface 78 of the member 72 thereby to cause clockwise movement of the lever from its position in Fig. 7 to its position illustrated in Fig. 17. It will be understood that during the movement of the mold assembly effected by the operation of the lever 64 the blocks 60 on the mold cover 34 come into locking engagement with the gibs 46 on the side portions 40 of the mold carriage. As the roll 74 moves away from the high surface of the cam 72 the lever 64 is returned by gravity into its normal rest position which is determined by the engagement of the angular forward end portion of an arm 80 of the lever 64 with an angular surface 82 formed at the junction of the angular struts 42 and the central strut 44. During the continued advancement of the mold assembly after the return of the lever 64 to its rest position the locked position of the mold cover is maintained by the frictional engagement of the blocks 60 with the gibs 46 until the mold assembly reaches the discharging station.

The advancement of the mold assembly is effected by the operation of a conveyor illustrated in Fig. 2 as a pair of chains 38. Each chain comprises an outer series of overlapping flat links one of which is identified by the numeral 84 and an inner series of overlapping flat links one of which is identified by the numeral 86. The two series of links are interconnected by rivets 88 which also provide the pivotal connections between the links and the means for mounting a series of rollers, one of which is identified by the numeral 90. The rollers travel on the top surfaces of two fixed rails 92. The mold carriage is attached to the conveyor chains by headed screws 94 and the angular disposition of the carriage relatively to the chains is determined by headed pins 96 at opposite sides of the screws 94. The pins perform the same function as the rivets 88 and are exteded through bores in the side portions 40 of the mold carriage. The conveyor chains, at their opposite ends, are mounted on suitable sprockets one of which is illustrated in Fig. 5 and identified by the numeral 98, a sprocket at the opposite end of the assembly being illustrated in Fig. 7 and identified by the numeral 100. The sprocket 98 and its companion sprocket (not shown) are fixed to a shaft 102 which is driven by an electric motor (not shown).

The illustrated conveyor carries a plurality of mold assemblies uniformly spaced from each other about the length of the conveyor. Referring to Fig. 5, a mold assembly which has been discharged at a discharging station, identified generally by the numeral 104, is shown advancing upwardly about the sprocket 98. It will be understood that the mold at this time is empty and has no cover mounted thereon. The mold is advanced by the conveyor from the sprocket 98 to a charging station beneath a hopper 106. From the charging station the mold advances beneath a doctor blade 108 which operates in conjunction with suction means hereinafter described to remove excess powder from the mold. After passing the doctor blade the conveyor advances the mold to a cover receiving station identified generally in Fig. 5 by the numeral 110. At this station the cover is manually placed on the mold, the position of the cover lengthwise of the mold being determined by the engagement of a downwardly extending angular lip 112 (Fig. 17) at the forward end of the cover with a complementally beveled surface at the forward end of the ring 32. After receiving the cover the mold is advanced by the conveyor through an ingress opening in an oven the left end portion of which is identified in Fig. 5 by the numeral 114. At this time the ring 32 is maintained in its elevated position, illustrated in Fig. 16, by the springs 50 and the charge in the mold is not compressed but remains in its loosely deposited condition which is assumed during the mold charging operation. The ring remains in its elevated position as the mold is advanced by the conveyor through the oven to a pressure station identified generally in Fig. 7 by the numeral 116. At this station a depressor assembly hereinafter described forces the cover 34 and the ring 32 downwardly into its position illustrated in Fig. 15 thereby compressing the charge in the mold. While the cover and the ring are maintained in their position illustrated in Fig. 15 by the depressor assembly the operation of the conveyor brings the roll 74 (Fig. 17) on the lever 64 into engagement with the cam member 72 causing the lever to swing in a clockwise direction thereby advancing the mold assembly relatively to the carriage and bringing the blocks 60 on the cover 34 into locking engagement with the gibs 46. During the continued advancement of the mold by the conveyor the gibs hold the cover 34 in its position illustrated in Fig. 15 thus maintaining the compression of the charge in the mold. A short distance beyond the pressure station the mold moves downwardly around the sprocket 100 which is located at the right end portion of the oven and proceeds in an inverted position through the lower portion of the oven. It will be understood that the abutment screw 56 (Fig. 17) prevents any appreciable movement of the mold assembly relatively to the carriage by gravity during the downward movement of the mold assembly around the sprocket 100. The conveyor advances the inverted mold through the lower portion of the oven and out of the oven through an egress opening in its left end wall located directly beneath the ingress opening hereinbefore referred to. The conveyor advances the mold from the egress opening in the oven to the discharging station 104 at which mechanism hereinafter described arrests the advancement of the mold assembly while permitting the continued advancement of the mold carriage, thus disengaging the gibs 46 from the blocks 60 and permitting the cover 34 to drop onto a continuously operating conveyor belt 118. The contemplated operation of the conveyor presupposes the use of a molding mixture which, when heat treated by the passage of the mold through the oven, will be free to drop from the mold at the discharging station when the cover is released. A mixture of a vinyl chloride polymer with a plasticizer and a pigment has been found to possess such characteristics. Such a mixture has no tendency to adhere to the metallic surfaces of the mold parts and contracts upon the application of heat thereto, thus separating the molded article from the wall of the mold cavity sufficiently to permit it to move freely from the inverted mold under the influence of gravity when the cover is released. Inasmuch as the cover drops only a short distance from the mold to the conveyor belt 118 there is no appreciable separation of the cover from the molded article during their downward movement from the mold to the conveyor belt and, consequently, the molded article is carried by the mold cover as it is advanced by the conveyor belt 118 to a receiving station where the operator manually lifts the cover and the molded article thereon from the belt and removes the molded article from the cover to a suitable cooling means.

Referring to Fig. 19, the molding mixture is supplied from a hopper 120 mounted on a suitable standard 122. From the base of the hopper the mixture is transmitted by a feed screw hereinafter described through suitable piping 124 to a blower indicated generally at 126. The blower transmits the powder through a pipe 128 to a tubular member 130 which connects the charging hopper 106 to a filter in the form of a bag 132 which is pervious to air but substantially impervious to the powder and thus permits the powder to be filtered from the air and to be carried by gravity through the tube into the charging hopper 106. Referring to Fig. 21, the feed screw in the base of the supply hopper 120 is indicated at 134. The feed screw is operated by a drive shaft 136 in a suitable power unit 138 connected by chain and sprocket mechanism to an extension 140 of the screw shaft. The drive shaft 136 also operates a plurality of agitator blades 142 fixed to a shaft 144 mounted in bearings in a base portion 146 of the hopper 120 positioned above and adjacent to the feed screw 134. The agitator shaft is oscillated by an eccentric disk 148 (Fig. 20) fixed to the drive shaft 136 and positioned between the arms of a yoke 150 fixed to the agitator shaft 144.

In order to prevent overloading of the charging hopper 106 means responsive to the weight of the powder in the hopper operates to interrupt the operation of the feed screw 134 in order to arrest the transmission of powder to the hopper. Referring to Fig. 5, the illustrated hopper is mounted for generally vertical movement on a parallel motion mechanism comprising four horizontal arms, two of which are illustrated in Fig. 5. The upper pair of arms 52 are pivotally mounted respectively at the upper extremities of two standards 154 and are pivotally connected at their free ends to opposite sides of the upper or body portion of the hopper 106. The lower pair of arms 156 are pivotally mounted on the standards 154 and pivotally connected at their free ends to the lower or funnel portion of the hopper 106. The hopper is urged upwardly by two vertical springs 158 anchored at their lower ends to the arms 152 and at their upper ends to angular brackets 160 secured respectively to the upper portions of the standards 154. The springs 158 yield to the weight of the powder transmitted to the charging hopper permitting the hopper to move downwardly. After a predetermined weight of powder has been transmitted to the charging hopper the forward arm 152 engages the button of a microswitch 162 mounted on a bracket 164 fixed to the standard 154. The operation of the microswitch opens a relay circuit to a magnet (not shown) connected to the motor which operates the feed screw 134. The deenergizing of the magnet causes the opening of the electric circuit to the motor thus interrupting the operation of the feed screw and arresting the transmission of powder to the charging hopper. The operation of the blower 126 continues without interruption in order to maintain the inflation of the filter bag 132. As the weight of powder in the charging hopper is reduced the springs 158 elevate the charging hopper and disengage the forward arm 152 from the microswitch 162 thus permitting the resumption of the operation of the feed screw. The base of the charging hopper 106 is normally closed by a screen 166 (Fig. 10) which is fine enough to cause the grains of powder to accumulate in the interstices thereof and thus to prevent the flow of powder therethrough. To provide for the flow of powder through the screen at the appropriate time a rotary brush 168 is constructed and arranged to sweep the lodged grains of powder from the interstices of the screen. The flow of powder through the screen continues while the brush operates but is arrested by the screen when the brush stops. As shown in Fig. 10, the screen is concavo-convex in cross section, the radius of curvature of the screen being substantially the same as the distance from the axis of rotation of the brush to the ends of the bristles. At its opposite ends the screen is soldered to the arcuate lower edge faces of the end walls of a housing 170 which is secured to a rectangular frame 172 fastened to the lower extremity of the hopper, the housing being provided with outwardly extending flanges 174 through which extend headed attaching screws 176. The brush 168 comprises three rows of bristles 178 uniformly spaced about a hub 180 which is fixed to a rotary shaft 182 journaled in bearings in vertical slides 183 mounted in the end walls of the housing 170. For actuating the brush a sprocket 184 (Fig. 9) is fixed to the forward end portion of the shaft 182 adjacent to the outer surface of the housing, and a chain 186 connects the sprocket to a like sprocket on a counter shaft 188 (Fig. 5) journaled in bearings in the standards 154. It will be understood that the axis of the brush shaft 182 is in vertical alinement with the bearings of the arms 152 and 156 on the charging hopper 106 and the counter shaft 188 is in vertical alinement with the bearings of said arms on the standard 154. Fixed to the forward end portion of the counter shaft 188 is a sprocket 190 which is connected by a chain 192 to a sprocket 194 at the forward end of a driven shaft 196 in a power unit 198. Attached to the lower end of the charging hopper and extending downwardly therefrom is a funnel 200 which registers with the mold cavity during the movement of the mold through the charging station. For starting and stopping the brush 168 a microswitch 202 is secured to a fixed standard 204 and installed in the electrical circuit to the motor which operates the power unit 198. The microswitch is operated by a slight rotation of a shaft 206 (Fig. 9) incorporated therein. To this end an arm 208 is fixed to an end portion of the shaft 206 projecting rearwardly from the housing of the microswitch, said arm having a roll 210 mounted at its free end and arranged to be engaged by a horizontal rail 212 on the mold carriage during the passage of the carriage through the charging station. The engagement of the rail 212 with the roll 210 causes a slight rotation of the shaft 206 in a clockwise direction, as seen in Fig. 9. Such rotation of the shaft operates the microswitch to close the circuit to the motor which operates the power unit 198, thus initiating the operation of the brush 168. The brush continues to operate until the rail 212 disengages the roll 210 whereupon means incorporated in the microswitch operates the switch to open the circuit thus arresting the operation of the brush. In order to prevent undue strain on the hopper 106 by the operation of the chain 186 two thrust bars 214 are positioned between the brush shaft 182 and the counter shaft 188. As shown in Fig. 9, the right end portions of the thrust bars have fixed thereto bearing members 216 freely mounted on the end portions of the shaft 182 and similar bearing members (not shown) on the opposite ends of the thrust bars are freely mounted on the counter shaft 188.

Immediately after leaving the charging station the mold, carrying loose powder somewhat mounded above the mold cavity, enters the doctoring station where the doctor blade 108 operates to level the powder in the mold cavity to the plane of the upper surface of the ring 32. Cooperating with the doctor blade is a suction tool 218 which removes the excess powder as it is lifted by the doctor blade. Referring to Fig. 9, the illustrated suction tool is a vertical member which tapers downwardly to provide a narrow suction opening positioned directly above and adjacent to the doctor blade, said opening being substantially coextensive with the blade lengthwise thereof. A flexible hose 220 connected to the upper end of the suction tool communicates with a suitable power driven suction means. The illustrated doctor blade assembly is in its general organization of known construction. Referring to Fig. 4, the blade is fixed to a carrier 222 which is supported for generally horizontal movement by a parallel motion mechanism comprising two vertical straps mounted at their upper ends on a horizontal bar 226 and at their lower ends on the opposite end portions of the blade carrier 222. Referring to Fig. 11, the horizontal bar 226 is supported at the free ends of four horizontal resilient plates 227. As shown in Fig. 4, each plate 227 is secured to a fixed crosshead 229 by two screws 231 and each plate 227 at its free end is attached by means of a screw 233 (Fig. 11) to a boss 235 projecting from the horizontal bar 226. To provide for the vertical adjustment of the doctor blade with relation to the surface of the mold ring 32 means is provided for moving the bar 226 downwardly against the resistance of the resilient plates 227. The illustrated adjusting means comprises two screws 237 each mounted in a rigid arm 241 projecting from the crosshead 229. As shown in Fig. 11, the screws 237 are arranged to bear against the upper surface of the horizontal bar 226 and are secured in adjusted position by lock nuts 239. For oscillating the blade lengthwise thereof the carrier is connected by a link 228 to an oscillating arm 230 which is actuated by a power driven eccentric 232. In order to position the mold accurately relatively to the doctor blade a pair of auxiliary rails 234 are provided for supporting the mold during its movement through the doctoring station. As shown in Fig. 8, the rails 234 are secured to angle brackets 236 fixed to crossbars in the frame, one of which is shown at 238 in Fig. 8. The angle brackets position the auxiliary rails beneath the opposite side portions 40 of the mold carriage. Cooperating with the suction tool 218 to remove excess powder from the side marginal portions of the mold ring 32 is a pair of tubular suction tools 240 (Fig. 9). The suction tools 240, together with the suction tool 218, are clamped in a fixture 242 which is secured by screws 244 to the upper surface of a fixed standard 246. The suction tools 240 have secured to their upper end portions two sections of hose 248 which communicate with the power operated suction means hereinbefore referred to. Some of the powder discharge from the hopper 106 falls from the mold and is accumulated in a waste bin 250 (Fig. 5) secured to horizontal sections of the frame. Referring to Fig. 19, the powder in the waste bin is removed by the operation of a blower 252 which sucks the powder out of the bin and blows it through a conductor pipe 254 communicating with a filter member or bag 256 from which the powder drops through a vertical conductor pipe 258. In the illustrated organization the pipe 258 conducts the powder into the supply bin 120. If the powder taken from the waste bin requires reprocessing before it can be combined with the powder in the supply bin 120 the pipe 258 will be arranged to direct the waste powder into a suitable receptacle preparatory to further processing.

The charge in the mold is heat treated, or sintered in an oven which is herein illustrated as an elongate structure made of angle iron and enclosed by insulating panels one of which is shown in Fig. 5 and identified by the numeral 260. The oven may be heated in any known manner. In Fig. 12 a plurality of electrically energized heating elements 262 are diagrammatically shown. The degree of heat in the oven is accurately regulated by suitable thermostats (not shown). In the illustrated organization the oven is maintained at a temperature of approximately 250° F. and the mold remains in the oven for a period of three minutes and fifteen seconds.

Referring to Fig. 13, the charge in the mold is compacted to a predetermined degree by the operation of a depressor herein illustrated as a hollow cylinder 264 slidably mounted on a fixed piston 266 and carrying at its lower extremity a plurality of pressure rollers 268. The piston 266 is secured by headed screws 270 to a superstructure 272 projecting upwardly from the frame of the oven and extending across the horizontal upper panel thereof. For mounting the rolls 268 a plate 274 formed integrally with the cylinder 264 and providing the base portion thereof has its side portions turned downward to provide bearings for pins 276 projecting from the opposite ends of the rollers, respectively. To provide clearance for the operation of the cylinder 264 a suitable opening is formed in the top panel 278 of the oven. The pressure rollers are normally held elevated slightly above their operating position by two springs 280 (Fig. 7) anchored at their lower ends to screw eyes 282 projecting upwardly from the base 274 and anchored at their upper ends to screw eyes 284 projecting laterally from the superstructure 272. The cylinder is moved downward to actuate the pressure rollers by pressure fluid which enters the lower portion of the cylinder 264 through a flexible tube 286. The pressure fluid is delivered by a pump 288 (Figs. 7 and 12) of known construction mounted on a platform 289 fixed to the lower portion of the frame of the oven and extending rearwardly therefrom. When the depressor assembly is at rest the pump 288 draws pressure fluid from a tank 290 through a pipe line 292 and returns it to the tank through a pipe 294. Upon the closing of a solenoid valve 295 (Fig. 7) the flow of pressure fluid through the pipe 294 is interrupted and pressure fluid delivered by the pump is conducted through a pipe 296 to the tube 286 and through the tube to the cylinder 264. The operation of the solenoid valve is initiated by closing a microswitch 298 mounted at the upper extremity of a bracket 300 fixed to the superstructure 272 and extending upwardly therefrom. For operating the microswitch a vertical rod 302 (Fig. 13) is slidably mounted in an axial bore in a cylindrical boss 304 projecting downwardly from the superstructure 272 and carrying in a yoke 306 at its lower extremity a roll 308 which is arranged to be engaged by a horizontal rail 310 fixed to the left side wall 40 of the mold carriage and arranged to extend lengthwise thereof. The rail moves the rod 32 upwardly to close the microswitch 298 and holds the switch closed by its engagement with the roll 308 during the passage of the mold through the pressure station. When the rail 310 disengages the roll a spring incorporated in the microswitch opens the switch thus deenergizing the solenoid and permitting a spring (not shown) to open the valve 295 to permit the flow of pressure fluid through the pipe 294 to the tank 290 thus relieving the pressure in the cylinder 264. Thereupon the springs 280 move the cylinder 264 upwardly, exhausting the fluid in the cylinder through the tube 286 and the pipe 294 to the tank 290 and returning the pressure rolls to their elevated or rest position. The pressure rolls exert a total pressure ranging from 500 to 700 pounds upon the mold cover 34 moving the mold cover and the ring 32 downwardly into their position illustrated in Fig. 15 and thus reducing the depth of the mold cavity and compacting the charge therein. The depressor assembly maintains its pressure on the mold cover while the lever 64 operates to move the mold assembly forwardly to bring the blocks 60 on the mold cover into locking engagement with the gibs 46 on the carriage. Upon the completion of the operation of the lever 64 the rail 310 moves out from under the roll 308 on the rod 302 thus permitting the opening of the microswitch 298 and the return of the cylinder 264 to its rest position.

In the event of a failure in the operation of the depressor assembly or the lever 64, the operation of the conveyor is interrupted by the engagement of the upper surface of the cover 34 with a roll 314 (Fig. 7) carried at the lower end of a sliding rod 316. The rod 316 acts against the bottom surface of the horizontal portion of a bent arm 318 fixed to a shaft 319. As shown in Fig. 12, the shaft is mounted in suitable journal members 321 and 323 fixed to the upper portion of the oven frame. Fixed to that end portion of the shaft 319 projecting forwardly from the journal member 321 is a horizontal arm 325 constructed and arranged to operate a microswitch 322. The operation of the microswitch closes a relay circuit to a plugging switch (not shown) which quickly arrests the operation of the conveyor motor and opens the motor circuit. The circuit remains open until a switch (not shown) is manually operated to close the motor circuit to resume the operation of the conveyor. While the conveyor is at rest the oven panel nearest to the mold assembly is removed and the mold cover is lifted from the mold and removed from the oven and the charge is removed from the mold cavity in any convenient manner, for example, by means of a hand brush. The oven panel is then replaced and the operation of the conveyor is resumed.

For disengaging the mold cover 34 from the carriage at the discharging station to permit the transfer of the cover and the preform by gravity to the conveyor belt 118 a fixed abutment member 324 (Fig. 6) is arranged in the path of the mold cover at the discharging station. The abutment member arrests the advancement of the mold elements while permitting the continued movement of the mold carriage thus bringing the gibs 46 out of registration with the blocks 60 on the mold cover and leaving the cover free to drop onto the conveyor belt. The ring and the mold base remain on the carriage being supported by the gibs 46. The abutment member 324 is so arranged as to permit the advancement of the ring and the mold base with the carriage after the mold cover has been transferred to the conveyor belt. The belt advances the mold cover and the preform thereon forwardly from a position beneath the conveyor assembly into a position where the operator may conveniently lift the cover from the conveyor belt. The illustrated conveyor belt is an endless band of heavy woven material such, for example, as duck or canvas mounted on a driven cylindrical rotor 326 (Fig. 8) positioned behind the main frame 328 and on an idle cylindrical rotor 330 positioned forwardly of the frame. The driven rotor is assembled with a gear reduction mechanism of known construction in a frame 332 mounted on a platform 334 fixed to and extending rearwardly from the main frame 328. The gear reduction mechanism is actuated by an electric motor 336 which is operatively connected to said mechanism by suitable chain and sprocket mechanism. The idle rotor 330 is mounted to rotate freely in suitable journal members 338 fixed to the upper surface of the platform 340 extending forwardly from the main frame 328. For arresting the forward movement of the mold cover by the conveyor belt two angle brackets 342 are secured to the platform 340 at opposite sides of the conveyor belt and have secured thereto a horizontal abutment rail 344 the lower surface of which is arranged substantially flush with the upper surface of the conveyor belt. For supporting the weight of the mold cover on the conveyor belt an elongate member 346 having a plane upper surface is positioned beneath and adjacent to the upper portion of the belt 118 by springs 348 surrounding headed screws 350 and bearing against washers 352 on the screws. The screws are fixed in crossbars 354 incorporated in the platform 340 and have their headed ends freely mounted in bores in the member 346.

In the operation of the illustrated organization a mold assembly, with the cover removed therefrom, is conveyed in its carriage through the mold charging station illustrated in Fig. 5 where the leading end of the rail 212 (Fig. 9) on the mold carriage engages the roll 210 on the arm 208 thus rotating the shaft 206 sufficiently to close the microswitch in the housing 202 in order to initiate the operation of the brush shaft 182. The operation of the brush causes powder in the charging hopper 106 to sift through the screen 166 and to flow by gravity through the funnel 200 into the mold cavity. After the mold cavity is filled the rail 212 is disengaged from the roll 210 and a spring (not shown) operates the microswitch to open the circuit to the brush operating motor, thus arresting the flow of powder through the funnel 200. The loaded mold enters the doctoring station immediately after the charging operation has been completed and the continuously oscillating doctor blade 108 removes the excess powder and levels the charge in the mold cavity. The powder lifted by the doctor blade is carried off through the suction tool 218 and any excess which may have fallen on the marginal portions of the ring is carried off by the suction tools 240. From the doctoring station the mold proceeds to the cover receiving station adjacent to the ingress opening of the oven where the operator manually deposits the cover on the ring, taking care to locate the lip of the cover adjacent to the beveled surface at the leading end of the ring.

In order to protect the operator from injury by the advancing mold assembly as it moves into the oven a suitable safety device is mounted on the end wall 114 of the oven. As shown in Fig. 5, this device comprises an arm 356 which is mounted to swing into engagement with the button of a microswitch 358. The arm is so located that any movement of the arm of the operator by the advancement of the mold assembly brings it into contact with the arm 358 thereby operating the microswitch. The operation of the microswitch closes a relay circuit to the plugging switch, hereinbefore referred to, which arrests the operation of the conveyor motor and opens the motor circuit. The circuit remains open until a switch (not shown) is manually operated to close the motor circuit thus affording the operator time to get out of danger before the operation of the conveyor is resumed.

The mold assembly advances from the ingress opening to the pressure station 116 with the powder comprising the charge in the mold under no appreciable pressure. At the pressure station the mold cover is depressed to reduce the depth of the mold cavity and thus to compact the charge therein and thereupon the mold is advanced relatively to the carriage by the operation of the lever 64 (Fig. 14) thereby locking the mold cover in its depressed position. As the mold assembly advances from the pressure station it passes beneath the roll 314 (Fig. 7) at the lower end of the rod 316. If the cover is locked in its depressed position the upper surface of the cover just clears the roll 314 and the operation of the conveyor assembly proceeds without interruption. In the event that either the depressor assembly or the locking lever fails to function the mold cover advances from the pressure station in its elevated position and the upper surface of the cover engages the roll 314 moving the rod 316 upwardly and causing the arm 325 to operate the microswitch 322 thereby to cause the operation of the conveyor assembly to be arrested. Thereupon the operator removes the oven panel adjacent to and at the rear of the microswitch 322 and manually removes the mold cover. The charge is then removed from the mold cavity in any convenient manner. The oven panel is then replaced and the operation of the conveyor is resumed.

If the depressor assembly and the locking lever operate satisfactorily the mold assembly completes its course through the oven and proceeds through the egress opening of the oven to the discharging station 104 (Fig. 5) where the mold cover is released from the carriage and is discharged by gravity together with the preform onto the conveyor belt 118 which moves the cover and the preform thereon forwardly into the receiving station at which the operator manually lifts the cover from the conveyor belt and in any convenient manner removes the preform from the cover to the table of a suitable cooling device (not shown).

In the use of the mold illustrated in the drawings there is produced a preform having the peripheral shape of two insoles reversed endwise relatively to each other and joined together along the complementally shaped portions of their inner edges. While the preform may be made of any suitable material it is proposed to employ a mixture of a vinyl chloride polymer with a plasticizer and a pigment. This mixture, after being subjected to heat and limited compaction, as hereinbefore described, becomes a plastic sheet characterized by a porous structure capable of conducting moisture from the foot to an absorbent fibrous sheet between the plastic sheet and the outsole of a shoe.

The preform, as it arrives at the receiving station after the completion of the illustrated operation thereon, is a weak, loosely sintered porous plastic sheet which requires further application of heat and pressure to make it suitable for use in the manufacture of insoles. In accordance with our preferred method, such further application of heat and pressure is effected in conjunction with the adhesive attachment of the porous plastic sheet to two relatively hard fibrous sheets. The second application of heat and pressure causes the plastic to soften thereby relieving strains in and dimensionally stabilizing the plastic sheet while compacting it and increasing its strength. At the same time the bonding agent becomes effective to attach the plastic sheet to the two fibrous sheets which, because of their resistance to distortion, restrain the plastic sheet against substantial shrinkage in its outline dimensions thereby maintaining substantially unchanged the size and shape of the plastic sheet as it arrived at the receiving station of the illustrated organization.

After the final application of heat and pressure to the preform and its adhesive attachment to the two fibrous sheets as above described the assembly is divided into two insole shapes by a severing cut along the curved line 360, illustrated in Fig. 2. The two sections thus provided are split to provide four insole shapes which are subsequently suitably rounded or otherwise trimmed to shape for use in shoe manufacture.

While the invention is herein illustrated in its application to the production of shapes or preforms intended to be used in the manufacture of insoles it will, of course, be understood that the invention is not limited in its scope to the production of shapes or preforms intended for this use but is applicable as well to the molding of many other articles.

Having thus described our invention, what we claim as new and desire to secure by Letters Patent of the United States is:

1. In combination, a mold carriage, a three piece mold mounted on the carriage, said mold comprising a base, a ring and a cover, pressure means for effecting relative movement of the base and the cover thereby to determine the depth of the mold, means rendered operative by movement of the mold elements lengthwise of the carriage for retaining the relative position of the mold elements caused by the pressure means, an actuator for effecting such movement of the mold elements, and means rendered effective by movement of the carriage for operating the actuator.

2. In combination, a conveyor, a mold carriage mounted on the conveyor, a three piece mold mounted on the carriage, said mold comprising a base, a ring and a cover, pressure means for effecting relative movement of the cover and the base to determine the depth of the mold, means rendered operative by movement of the mold elements relatively to the carriage for retaining the relative position of the mold elements effected by the pressure means, an actuator mounted on the carriage and constructed and arranged to effect such movement of the mold elements relatively to the carriage, and means rendered effective by the operation of the conveyor for operating the actuator.

3. In combination, a three part mold comprising a base, a ring and a cover, a mold carriage, a conveyor whereby the carriage is advanced through a mold charging station and a mold pressure station, means on the carriage for determining a position of the ring relatively to the base depthwise of the mold when the mold is at the charging station, and means on the carriage for determining a position of the ring and the cover relatively to the base depthwise of the mold when the mold is at the pressure station.

References Cited in the file of this patent

UNITED STATES PATENTS

| | | |
|---|---|---|
| 1,041,540 | White | Oct. 15, 1912 |
| 1,165,130 | LaRosa | Dec. 21, 1915 |
| 1,286,681 | Loudenbeck | Dec. 3, 1918 |
| 1,488,130 | D'Onofrio | Mar. 25, 1924 |
| 1,530,308 | De Bas | Mar. 17, 1925 |
| 1,563,037 | Mead | Nov. 24, 1925 |
| 1,656,909 | Dewey | Jan. 24, 1928 |
| 1,706,874 | De Journo | Mar. 26, 1929 |
| 1,751,869 | Mayne | Mar. 25, 1930 |
| 1,835,914 | Stockdale | Dec. 8, 1931 |
| 1,948,344 | Fischer | Feb. 20, 1934 |
| 1,958,422 | Dinzl | May 15, 1934 |
| 1,959,612 | Burge | May 22, 1934 |
| 1,965,732 | Bisterfield | July 10, 1934 |

(Other references on following page)

UNITED STATES PATENTS

| Number | Name | Date |
|---|---|---|
| 2,027,165 | Grubman | Jan. 7, 1936 |
| 2,103,860 | Mazzeo | Dec. 28, 1937 |
| 2,204,151 | Rodefer et al. | June 11, 1940 |
| 2,399,914 | Doering et al. | May 7, 1946 |
| 2,428,878 | Johnson | Oct. 14, 1947 |
| 2,499,209 | Balasquide | Feb. 28, 1950 |
| 2,577,275 | Sampson | Dec. 4, 1951 |
| 2,579,527 | Weyerhaeuser | Dec. 25, 1951 |
| 2,581,898 | Alexander et al. | Jan. 8, 1952 |
| 2,641,819 | Peavy | June 16, 1953 |
| 2,699,590 | Repress et al. | Jan. 18, 1955 |
| 2,730,760 | Bibby | Jan. 17, 1956 |
| 2,734,249 | Willis | Feb. 14, 1956 |
| 2,755,505 | Bishop | July 24, 1956 |